(12) United States Patent
Koeppel et al.

(10) Patent No.: US 12,393,821 B2
(45) Date of Patent: Aug. 19, 2025

(54) ANTENNA FORMED USING LASER PLATING OR PRINT-AND-PLATING FOR FIELD-POWERED SHORT RANGE COMMUNICATIONS

(71) Applicant: Capital One Services, LLC, McLean, VA (US)

(72) Inventors: Adam Koeppel, Washington, DC (US); Tyler Locke, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/583,388

(22) Filed: Feb. 21, 2024

(65) Prior Publication Data
US 2024/0193397 A1    Jun. 13, 2024

Related U.S. Application Data

(63) Continuation of application No. 17/447,459, filed on Sep. 13, 2021, now Pat. No. 11,983,595, which is a continuation of application No. 16/675,795, filed on Nov. 6, 2019, now Pat. No. 11,120,322, which is a continuation of application No. 16/296,910, filed on Mar. 8, 2019, now abandoned, which is a continuation of application No. 15/817,723, filed on Nov. 20, 2017, now Pat. No. 10,268,946.

(51) Int. Cl.
*G06K 19/077* (2006.01)

(52) U.S. Cl.
CPC . *G06K 19/07773* (2013.01); *G06K 19/07718* (2013.01); *G06K 19/07722* (2013.01); *G06K 19/07794* (2013.01); *G06K 19/07766* (2013.01)

(58) Field of Classification Search
CPC ....... G06K 19/07773; G06K 19/07718; G06K 19/07722; G06K 19/07794; G06K 19/07766
See application file for complete search history.

(56) References Cited

U.S. PATENT DOCUMENTS

| | | |
|---|---|---|
| 6,916,208 B2 | 7/2005 | Chen et al. |
| 8,244,302 B2 | 8/2012 | Fujino et al. |
| 9,272,370 B2 | 3/2016 | Finn et al. |

(Continued)

FOREIGN PATENT DOCUMENTS

| | | |
|---|---|---|
| CN | 104209516 A | 12/2014 |
| CN | 104471791 A | 3/2015 |

(Continued)

OTHER PUBLICATIONS

Extended European Search Report for Application No. EP18206952.6, mailed on Apr. 10, 2019, 6 pages.

*Primary Examiner* — Jamara A Franklin
(74) *Attorney, Agent, or Firm* — Harrity & Harrity, LLP

(57) ABSTRACT

A method of fabricating a transaction card for communicating data relating to a transaction may include forming a pattern in a plastic film using a laser plating process or a print-and-plate process; providing a conductive material in the pattern formed in the plastic film, using a plating process, to form a RF antenna layer in the plastic film, wherein the RF antenna layer includes a RF antenna; and affixing the plastic film to a surface of the transaction card to permit the RF antenna to inductively connect to a printed circuit board (PCB) of the transaction card.

20 Claims, 7 Drawing Sheets

(56) References Cited

U.S. PATENT DOCUMENTS

| | | |
|---|---|---|
| 10,176,414 B1 | 1/2019 | Koeppel |
| 10,268,946 B1 | 4/2019 | Koeppel et al. |
| 11,120,322 B2 | 9/2021 | Koeppel et al. |
| 2001/0044013 A1 | 11/2001 | McDonough et al. |
| 2005/0197074 A1 | 9/2005 | Cullen et al. |
| 2006/0220868 A1 | 10/2006 | Takasawa et al. |
| 2009/0315320 A1* | 12/2009 | Finn ................ H01Q 1/38 |
| | | 156/196 |
| 2012/0038445 A1 | 2/2012 | Finn |
| 2013/0206846 A1 | 8/2013 | Wilkinson |
| 2014/0021261 A1* | 1/2014 | Mosteller ......... G06K 19/07745 |
| | | 156/247 |
| 2014/0246504 A1 | 9/2014 | Ikemoto et al. |
| 2015/0041546 A1 | 2/2015 | Herslow et al. |
| 2015/0097040 A1 | 4/2015 | Rampetzreiter et al. |
| 2015/0186768 A1 | 7/2015 | Peters |
| 2016/0365644 A1 | 12/2016 | Finn et al. |
| 2017/0032233 A1 | 2/2017 | Nakano et al. |
| 2017/0206448 A1 | 7/2017 | Pueschner et al. |
| 2019/0205723 A1 | 7/2019 | Koeppel et al. |
| 2022/0067478 A1 | 3/2022 | Koeppel et al. |

FOREIGN PATENT DOCUMENTS

| | | |
|---|---|---|
| DE | 102014114570 A1 | 4/2015 |
| DE | 102016100898 A1 | 7/2017 |

* cited by examiner

ANTENNA FORMED USING LASER PLATING OR PRINT-AND-PLATING FOR FIELD-POWERED SHORT RANGE COMMUNICATIONS

RELATED APPLICATIONS

This application is a continuation of U.S. patent application Ser. No. 17/447,459, filed Sep. 13, 2021, which is a continuation of U.S. patent application Ser. No. 16/675,795, filed Nov. 6, 2019, (now U.S. Pat. No. 11,120,322) which is a continuation of U.S. patent application Ser. No. 16/296,910, filed Mar. 8, 2019, which is a continuation of U.S. patent application Ser. No. 15/817,723, filed Nov. 20, 2017 (now U.S. Pat. No. 10,268,946), the contents of which are incorporated herein by reference in their entireties.

BACKGROUND

Contactless transactions involve use of transaction cards (e.g., a credit card, a debit card, a gift card, an automated teller machine (ATM) card, a rewards card or client loyalty card, and/or the like) and/or devices (e.g., a smart transaction card, a smartphone, and/or the like) in transactions to pay for products or services at transaction terminals (e.g., point of sale (POS) terminals) of individuals or businesses engaged in the sale of goods or services without a need for the transaction cards or devices to contact the transaction terminals (e.g., via a swipe of a card reader or an insertion into a chip reader). In some instances, radio frequency (RF) antennas and/or radio frequency identification (RFID) tags may be included in contactless transaction cards to provide identification information associated with the transaction cards (e.g., an account identifier, account information, a payment token, and/or the like). Accordingly, consumers may utilize the transaction cards or devices with a RF antenna and/or a RFID tag by waving the transaction cards or devices over or near contactless transaction terminals to pay the individuals or businesses.

SUMMARY

According to some implementations, a method of fabricating a transaction card for communicating data relating to a transaction may include forming a pattern in a plastic film using a laser plating process or a print-and-plate process; providing a conductive material in the pattern formed in the plastic film, using a plating process, to form a RF antenna layer in the plastic film, wherein the RF antenna layer includes a RF antenna; and affixing the plastic film to a surface of the transaction card to permit the RF antenna to inductively connect to a printed circuit board (PCB) of the transaction card.

According to some implementations, a method of fabricating a transaction card for communicating data relating to a transaction may include providing a PCB within the transaction card; forming a RF antenna layer, on a surface of the transaction card, and using a laser plating process or print-and-plate process. The RF antenna layer may include a pattern in which a conductive material is deposited to form a RF antenna, and the RF antenna may be inductively connected to the PCB of the transaction card.

According to some implementations, a transaction card for communicating data relating to a transaction may include a card body; a substrate affixed to the card body, the substrate including a RF antenna, the RF antenna being provided in a pattern on the substrate; and a PCB provided within or on the card body and to which the RF antenna is configured to be inductively connected via an antenna trace of the PCB.

DETAILED DESCRIPTION

The following detailed description of example implementations refers to the accompanying drawings. The same reference numbers in different drawings may identify the same or similar elements.

A transaction card may be used to facilitate transactions at transaction terminals (e.g., PoS terminals, ATM terminals, access terminals (e.g., locking mechanisms for gates, doors, rooms, etc.), reward redemption terminals, and/or the like). A transaction card may include components to enable a contactless transaction. For example, a transaction card may include a contactless module that is capable of performing contactless transactions using a near field communication (NFC) technique with a RF antenna of the transaction card. In some implementations, the transaction card may include a Europay-Mastercard-Visa (EMV) or other chip-card transaction capability and/or the like.

Some techniques for forming RF antennas may be expensive and/or difficult to implement. For example, one technique may involve forming a coil using a magnetic wire, and the coil may be inductively or electrically connected to the transaction card. In other words, the coil may be formed directly on the transaction card. This may be expensive and may add significant width to the transaction card, which may be undesirable to the user of the card. Additionally, a NFC transaction card may be expensive and fragile when formed using a magnetic wire coil technique.

Some implementations described herein provide formation of a RF antenna layer on or in a substrate (e.g., a plastic film) that is affixed to or included as a layer of a transaction card. For example, the RF antenna layer may be formed using a laser plating process or a print-and-plate process. Forming the RF antenna layer on or in the substrate using the laser plating process or the print-and-plate process may be cheaper and/or more efficient than forming the RF antenna using a magnetic wire formation technique. In some implementations, the RF antenna layer may be formed on a PCB of the transaction card (e.g., using PCB fabrication techniques such as photoengraving, PCB milling, or laser resist ablation) or on a graphical layer of the transaction card. In this way, manufacturing costs of transaction cards with contactless transaction capabilities may be reduced, and durability of such transaction cards may be improved.

Figure 1:
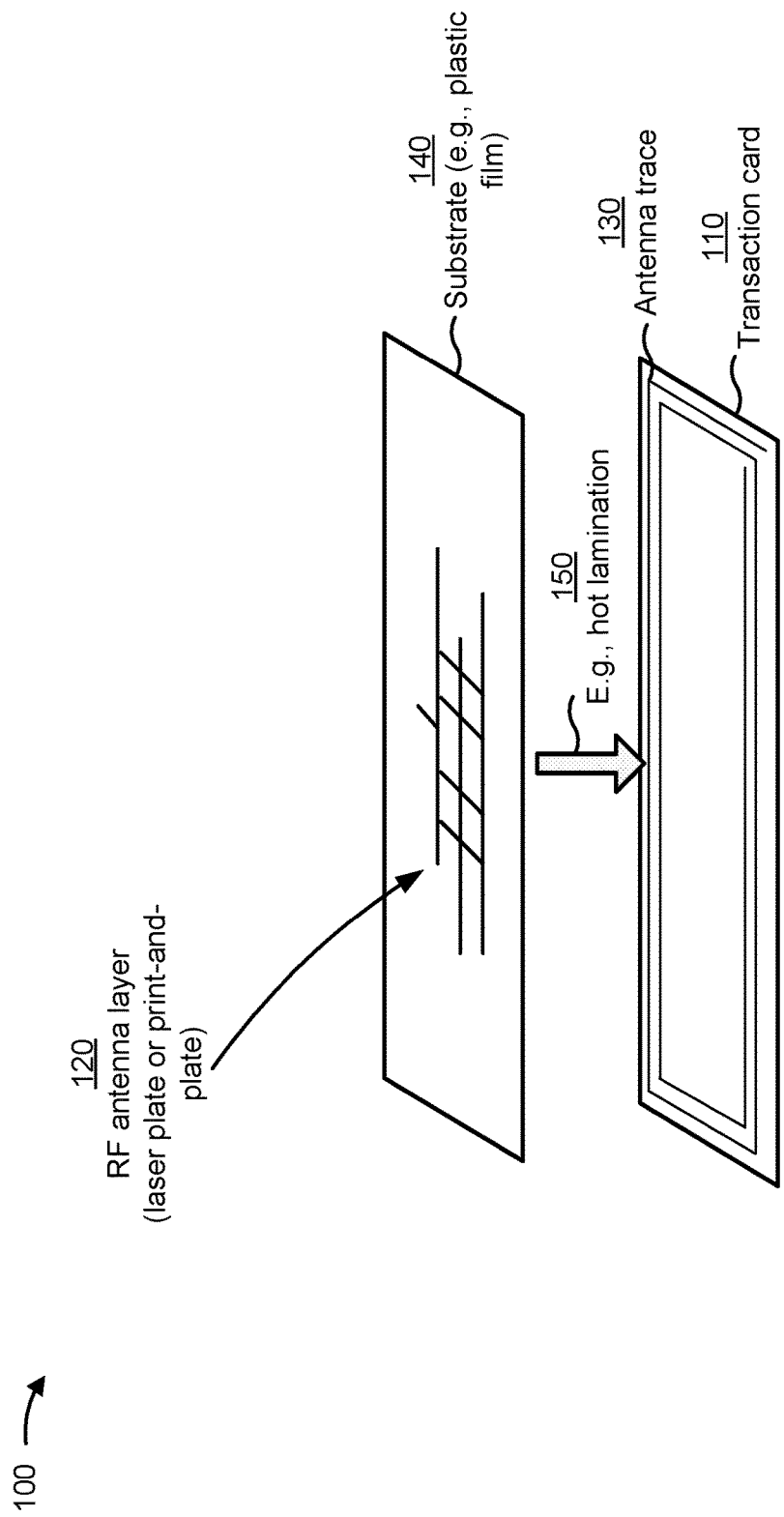
FIGS. 1-5 are diagrams of examples of a transaction card having, for example, an RF antenna layer formed using a laser plating or print-and-plate process, as described herein.

FIG. 1 is a diagram of a first example 100 of a transaction card 110 having, for example, an RF antenna layer 120 formed using a laser plating or print-and-plate process, as described in more detail below. Transaction card 110 includes a transaction card that is capable of storing and/or communicating data for a point-of-sale transaction (e.g., with a transaction terminal, a user device, etc.). For example, transaction card 110 may store or communicate data including account information (e.g., an account identifier, a cardholder identifier, etc.), expiration information of transaction card 110, banking information, transaction information (e.g., a payment token), and/or the like. For example, to store or communicate the data, transaction card 110 may include a magnetic strip, an integrated circuit (IC) chip (e.g., an EMV chip), and/or a PCB. In some implementations, transaction card 110 may be a smart transaction card, capable of communicating wirelessly (e.g., via Bluetooth, Bluetooth Low Energy (BLE), and/or the like) with a computing device, such as a smartphone, a digital wallet, and/or other devices. Transaction card 110 may include a plurality of layers, such as a card body (e.g., composed of a metal, a plastic, or another material), one or more graphical layers, a PCB, and/or the like.

Transaction card 110, or a PCB of transaction card 110, may include an antenna trace 130. Antenna trace 130 may be a passive RF antenna or an active RF antenna. In some aspects, antenna trace 130 may be formed within the PCB, may be formed on a body of transaction card 110, and/or the like. Antenna trace 130 may be inductively connectable to an RF antenna, as described in more detail below. Antenna trace 130 may have any size, shape, or orientation on transaction card 110, and is not limited to the size, shape, and orientation shown in FIGS. 1-5. In some implementations, antenna trace 130 may include a size, a shape, and an orientation that depends on a size, a shape, and an orientation of transaction card 110. In some implementations, antenna trace 130 may be formed from a variety of materials, such as a conductive material (e.g., copper, gold, aluminum, tin, platinum, silver, etc.), and/or the like.

As further shown, a substrate 140 may be affixed to transaction card 110. In some implementations, substrate 140 may be a film, such as a plastic film, a polycarbonate film, or another type of film. In some implementations, substrate 140 may be an external layer of transaction card 110. For example, substrate 140 may be affixed to a surface of transaction card 110. In some implementations, substrate 140 may be an internal layer of transaction card 110. Substrate 140 may have any size, shape, or orientation on transaction card 110, and is not limited to the size, shape, and orientation shown in FIGS. 1-5. In some implementations, substrate 140 may include a size, a shape, and an orientation that depends on a size, a shape, and an orientation of transaction card 110.

As further shown, substrate 140 may include a RF antenna layer 120. In some implementations, RF antenna layer 120 may be formed using a laser plating process. A laser plating process may include a laser deposition process wherein a material is deposited on a substrate using a laser. For example, a laser deposition process may be performed by injecting a metal powder (e.g., a conductive material) into a laser beam and depositing the metal powder on a surface of substrate 140 where the laser beam is incident to form RF antenna layer 120. In some implementations, RF antenna layer 120 may be formed using a laser etching process, wherein a conductive material is ablated to form RF antenna layer 120 without deposition. In some aspects, RF antenna layer 120 may be formed using a print-and-plate process. The print-and-plate process may include utilizing an ink (e.g., a catalytic precursor ink) to create (e.g., "print") a pattern in substrate 140, and providing a conductive material (e.g., copper, gold, etc.) in the pattern formed in substrate 140, using a plating process, to form RF antenna layer 120. The ink may control horizontal dimensions of line width and spacing of the pattern. Vertical dimensions of the pattern may be controlled using a plating process that deposits the conductive material only on the pattern defined by the ink. The ink may create strong bonds between the conductive material and substrate 140, which may improve a durability of RF antenna layer 120 and may eliminate a need for adhesives and other bonding methods.

In some implementations, a RF antenna of RF antenna layer 120 may be for NFC by transaction card 110. In this way, a RF antenna layer 120 is formed on substrate 140 that may be separate from transaction card 110, which, in some implementations, may be cheaper and more durable than forming RF antenna layer 120 on transaction card 110.

As shown by reference number 150, substrate 140 may be affixed to transaction card 110. For example, substrate 140 may be affixed to transaction card 110 using a laminate layer (e.g., based on hot lamination, cold lamination, or a similar technique), an adhesive layer, and/or the like. In some implementations, substrate 140 may be affixed to a surface of transaction card 110. In some implementations, substrate 140 may be included as an internal layer of transaction card 110. For example, the substrate may be provided between two or more layers of transaction card 110.

In some implementations, the RF antenna of RF antenna layer 120 may inductively connect with antenna trace 130. For example, the RF antenna and antenna trace 130 may be configured to inductively connect with each other. By using an inductive connection, durability of transaction card 110 may be improved in comparison to using a physical connection between the RF antenna and antenna trace 130.

As indicated above, FIG. 1 is provided merely as an example. Other examples are possible and may differ from what was described with regard to FIG. 1.

Figure 2:
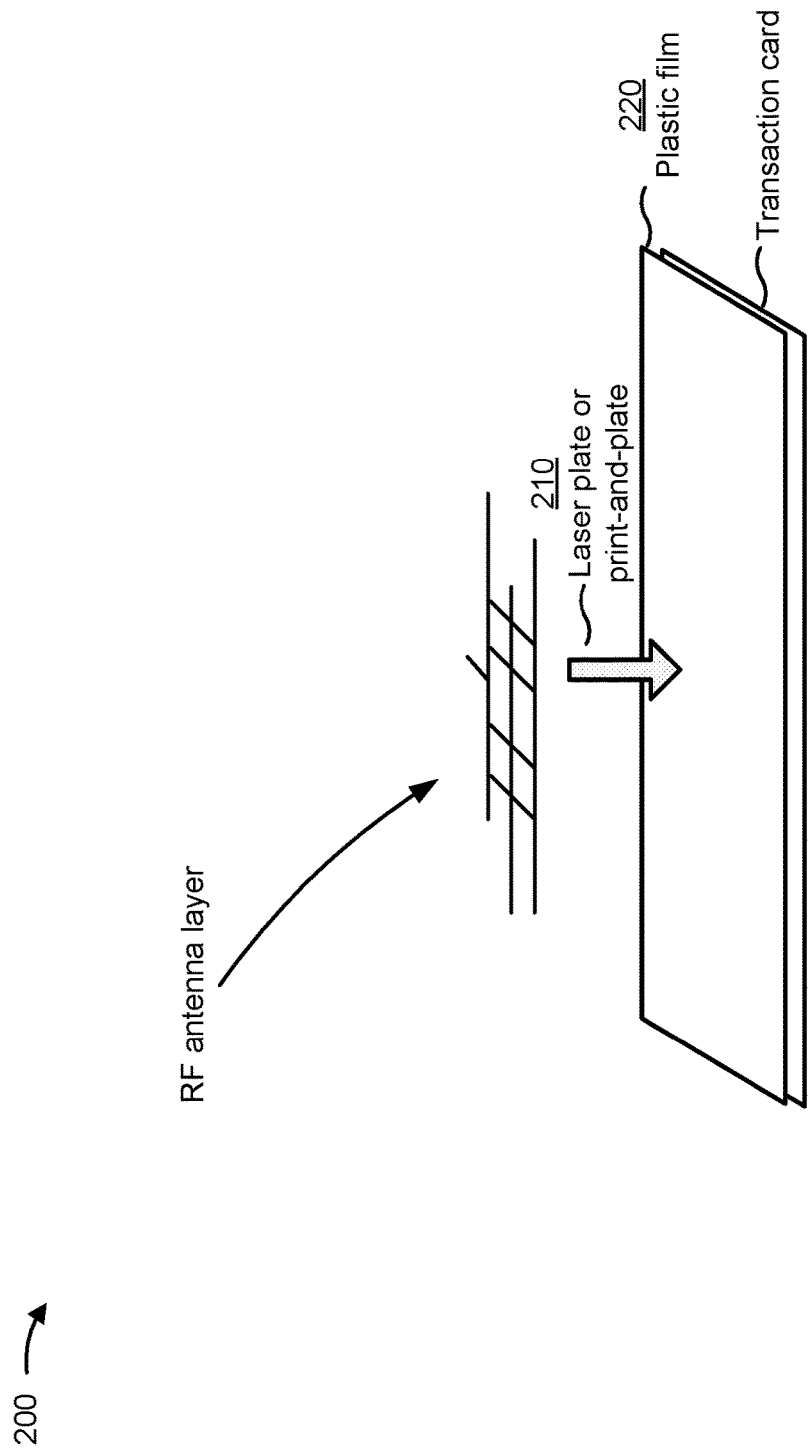

FIG. 2 is a diagram of a second example 200 of a transaction card having, for example, an RF antenna layer formed using a laser plating or print-and-plate process. The transaction card of example 200 may correspond to transaction card 110. As shown by reference number 210, in some implementations, a laser plating or print-and-plate technique may be used to form a RF antenna layer (corresponding to RF antenna layer 120) on or in a plastic film 220. Plastic film 220 may be a substrate, such as substrate 140. In example 200, the RF antenna layer is formed on or in plastic film 220 after plastic film 220 is affixed to a surface of the transaction card. This may simplify affixture of plastic film 220 to the surface of the transaction card.

As indicated above, FIG. 2 is provided merely as an example. Other examples are possible and may differ from what was described with regard to FIG. 2.

Figure 3:
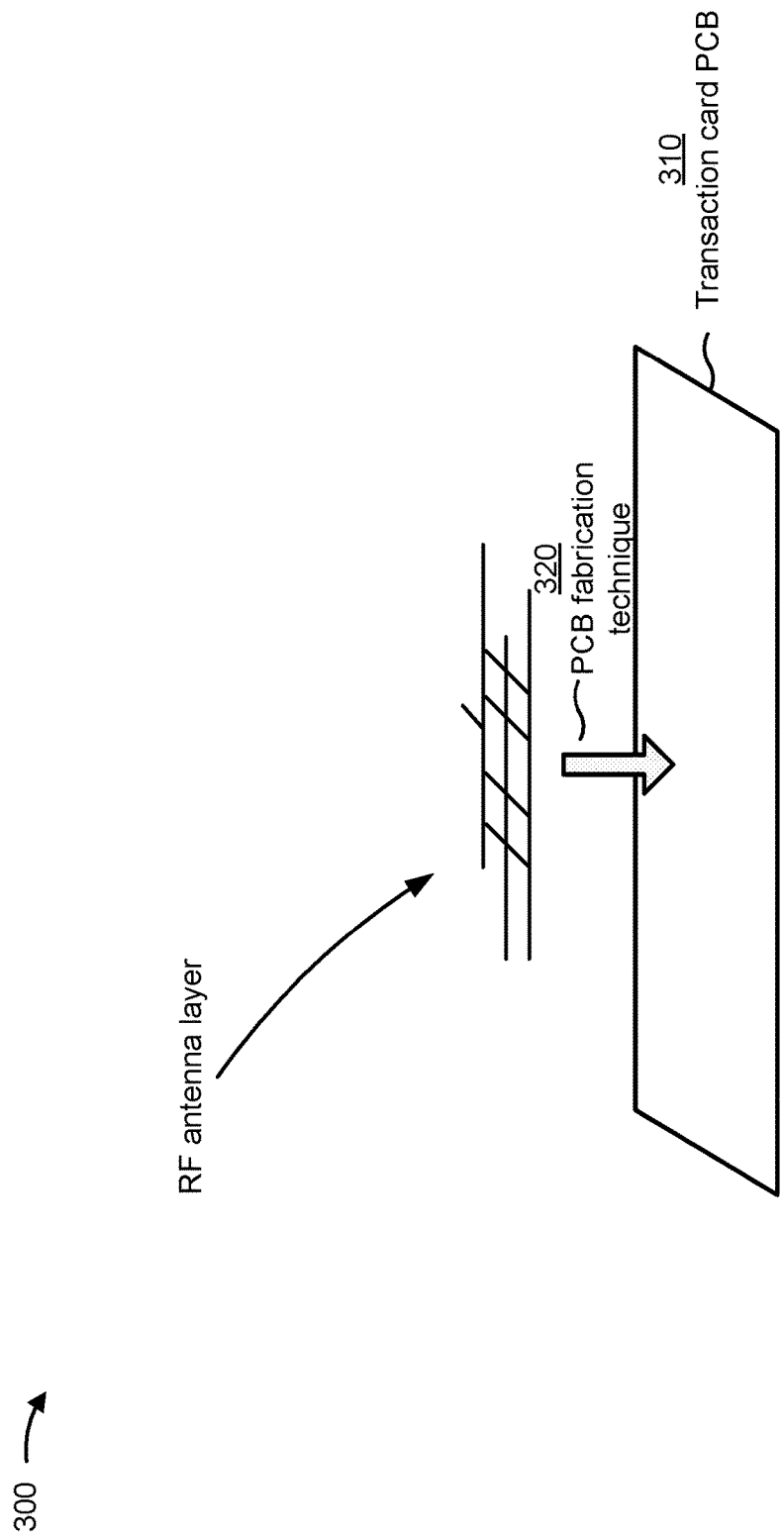

FIG. 3 is a diagram of a third example 300 of a transaction card having, for example, an RF antenna layer formed using a laser plating or print-and-plate process. As shown in FIG. 3, a RF antenna layer (corresponding to RF antenna layer 120) may be formed on or included in a transaction card PCB 310. Transaction card PCB 310 may include a PCB of the transaction card, such as the IC or PCB described above in connection with FIG. 1. As shown by reference number 320, the RF antenna layer may be formed on or included in transaction card PCB 310 using a PCB fabrication technique, such as print-and-plate, copper patterning, deposition, chemical etching, lamination, or another technique. By forming the RF antenna layer on or including the RF antenna layer in transaction card PCB 310, manufacturing of the transaction card may be simplified in comparison to forming the RF antenna layer on a substrate and affixing the substrate to the transaction card.

As indicated above, FIG. 3 is provided merely as an example. Other examples are possible and may differ from what was described with regard to FIG. 3.

Figure 4:
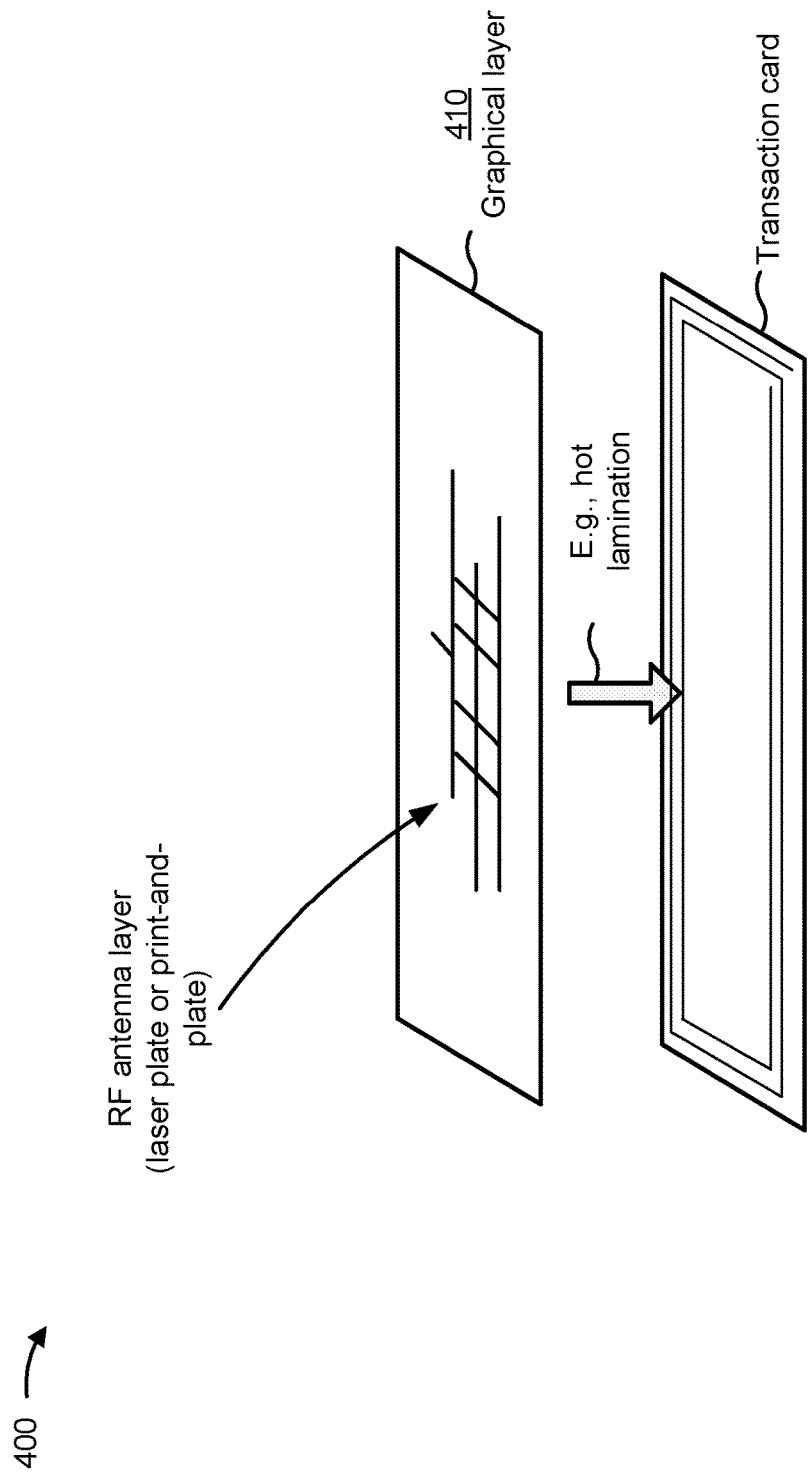

FIG. 4 is a diagram of a fourth example 400 of a transaction card having, for example, an RF antenna layer formed using a laser plating or print-and-plate process. The transaction card of example 400 may correspond to transaction card 110. As shown, an RF antenna layer (corresponding to RF antenna layer 120) may be formed on or within a graphical layer 410 (e.g., using a laser plating techniques, a print-and-plate technique, and/or the like). Graphical layer 410 may include a substrate (e.g., a plastic film, a polycarbonate film, etc.) that includes a graphic to be applied to the transaction card. By forming the RF antenna layer on or within graphical layer 410, manufacturing of the transaction card may be simplified in comparison to forming the RF antenna layer on a substrate other than graphical layer 410 and affixing the substrate, other than graphical layer 410, to the transaction card.

As indicated above, FIG. 4 is provided merely as an example. Other examples are possible and may differ from what was described with regard to FIG. 4.

Figure 5:
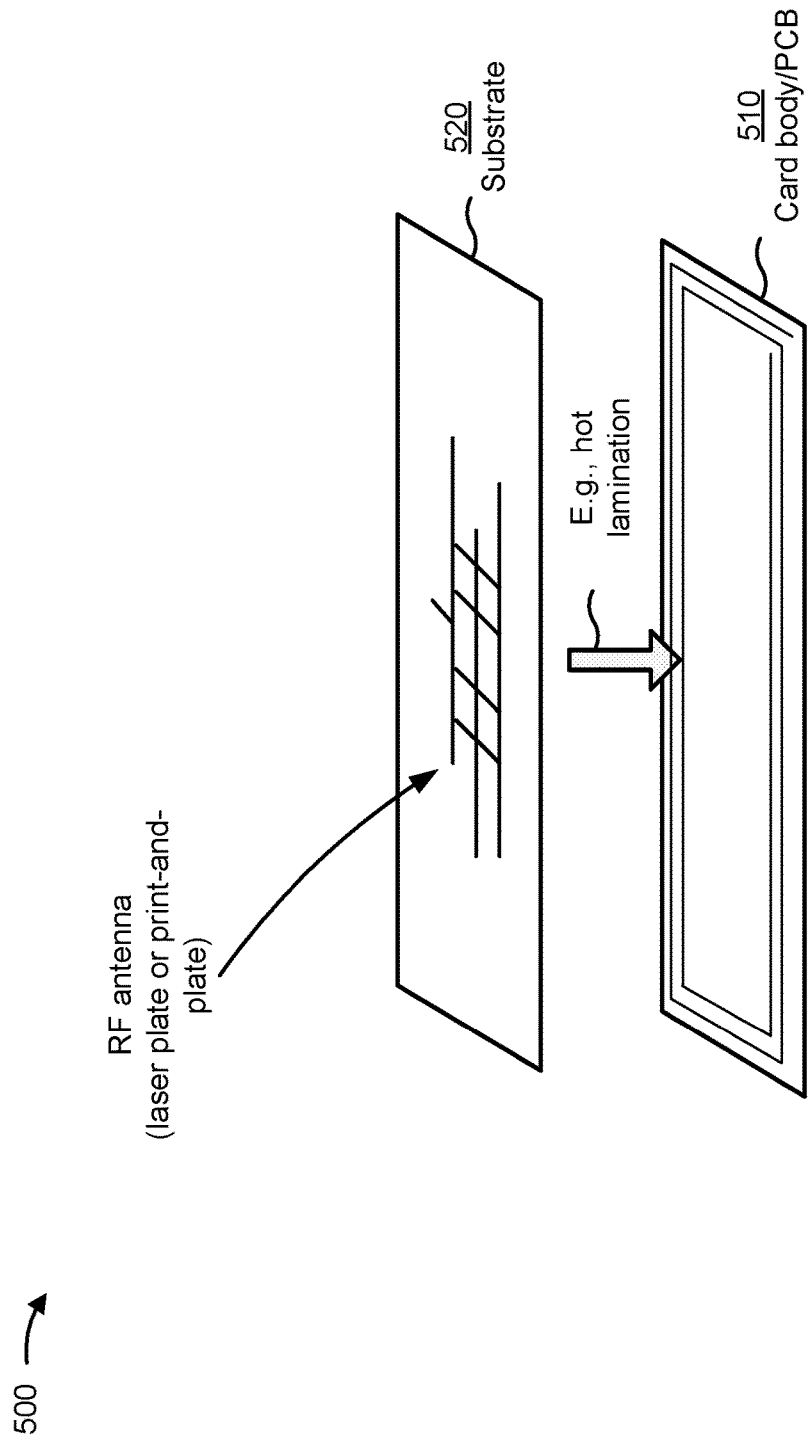

FIG. 5 is a diagram of a fifth example 500 of a transaction card having, for example, an RF antenna formed using a laser plating or print-and-plate process. As shown, the transaction card of example 500 may include a card body/PCB 510. Card body/PCB 510 may include a card body, which may be a layer of plastic, metal, or another suitable (e.g., non-conductive) material. Card body/PCB 510 may also include a PCB provided within or on the card body.

As further shown, a substrate affixed to the card body may include a RF antenna. For example, the RF antenna may be provided in a pattern on the substrate. In some implementations, the RF antenna may be configured to be inductively connected via an antenna trace of card body/PCB 510. Here, the antenna trace is shown as a rectangular spiral, although the antenna trace can have any shape, configuration, or orientation. In some implementations, the RF antenna may be formed on or in a substrate 520 using a laser plating process, a print-and-plate process, and/or the like. As further shown, substrate 520 may be affixed to the card body/PCB 510. For example, substrate 520 may be affixed using a lamination layer, an adhesive layer, and/or the like, as described in more detail elsewhere herein. By affixing substrate 520, including the RF antenna, to card body/PCB 510, manufacturing costs may be reduced in comparison to forming the RF antenna directly on card body/PCB 510.

As indicated above, FIG. 5 is provided merely as an example. Other examples are possible and may differ from what was described with regard to FIG. 5.

Figure 6:
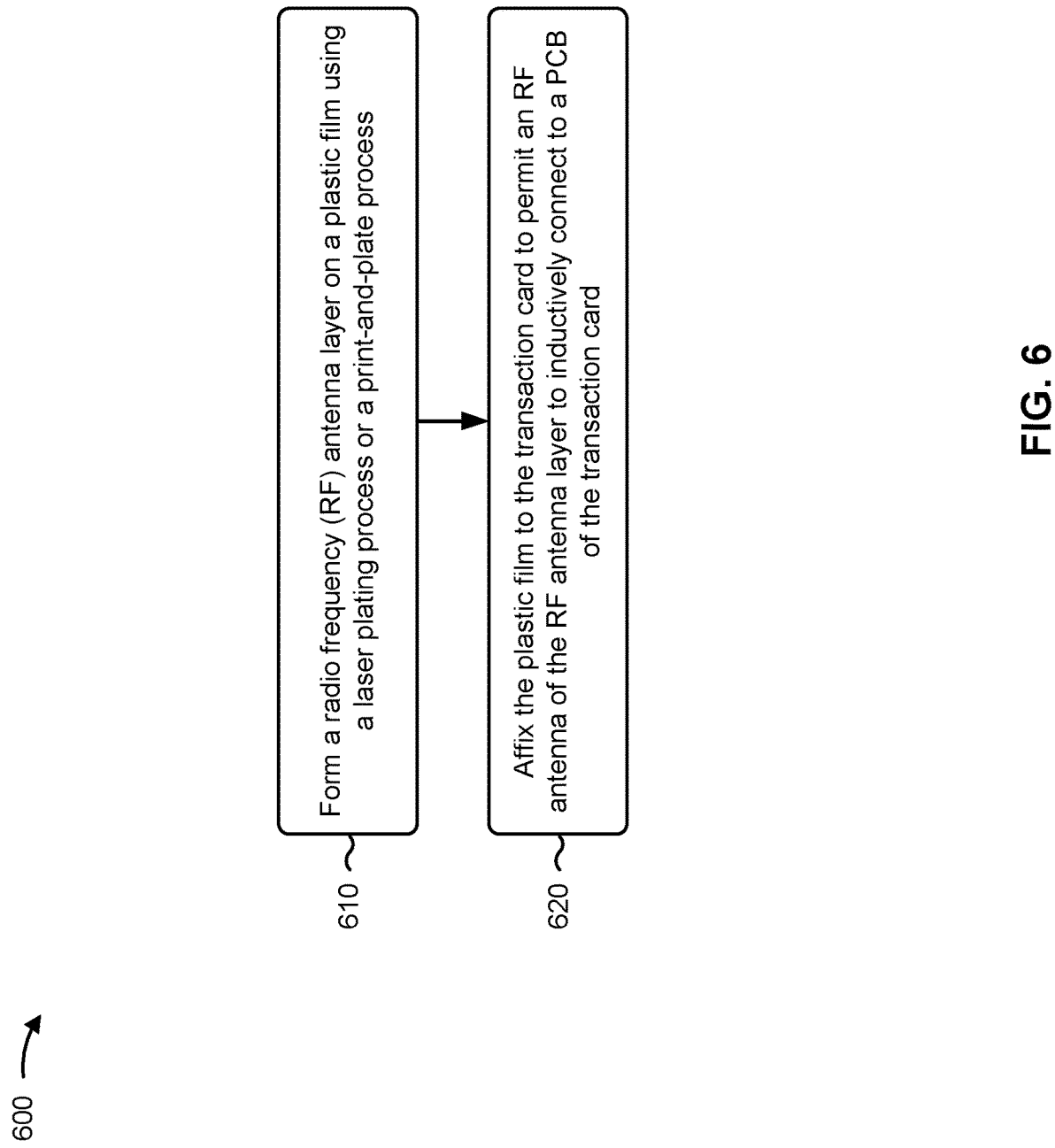
FIG. 6 is a flow chart of an example process for manufacturing a transaction card having, for example, a laser plated film-based antenna.

FIG. 6 is a flow chart of an example process 600 for manufacturing or fabricating a transaction card having, for example, an RF antenna layer formed using a laser plating or print-and-plate process. Process 600 may describe a process of manufacture for any one or more of FIGS. 1-5.

As shown in FIG. 6, process 600 may include forming a radio frequency (RF) antenna layer on a plastic film using a laser plating process or a print-and-plate process (block 610). For example, a laser plating process (e.g., a laser deposition process), a laser etching process, or a print-and-plate process may be used to form an RF antenna layer that include a RF antenna on a substrate, such as a plastic film. In some implementations, the substrate may be composed of any non-conductive material. By forming the RF antenna layer on the plastic film, rather than on a transaction card to which the plastic film is to be affixed, a cost of manufacturing the transaction card may be reduced. In some implementations, the plastic film may be affixed to the transaction card before the RF antenna layer is formed on the plastic film. In some implementations, the plastic film may be affixed to the transaction card after the RF antennal layer is formed on the plastic film. Thus, a RF antenna layer that includes a RF antenna is formed. The RF antenna may be configured to inductively connect with a PCB of the transaction card, as described in more detail herein.

As further shown in FIG. 6, process 600 may include affixing the plastic film to a surface of the transaction card to permit the RF antenna to inductively connect to a PCB of the transaction card (block 620). For example, the substrate (e.g., plastic film) may be affixed to a surface of the transaction card (e.g., using a lamination layer, an adhesive layer, and/or the like). As a more particular example, the plastic film may be affixed to the transaction card using a hot lamination process. Alternatively, the plastic film may be affixed to the transaction card using a cold lamination process. Alternatively, the plastic film may be affixed to the transaction card using an adhesion process. The substrate may be affixed to the surface of the transaction card to permit the RF antenna of the RF antenna layer to inductively connect to the PCB of the transaction card (e.g., an antenna trace of the PCB of the transaction card). For example, the RF antenna layer may be configured to be inductively connected to an antenna trace of the PCB. Thus, a RF antenna may be provided in or on a substrate and affixed to a transaction card, thereby reducing manufacturing costs and improving durability of the transaction card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
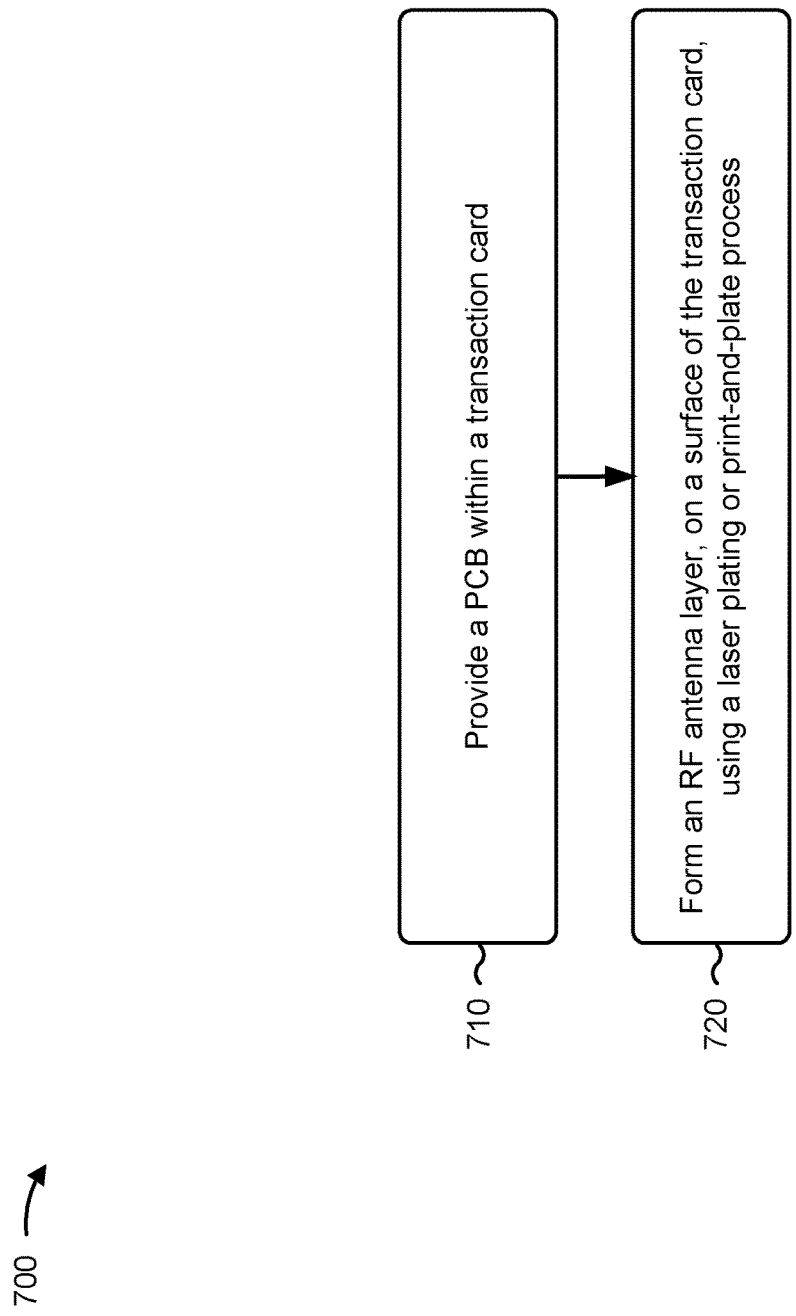
FIG. 7 is a flow chart of another example process for manufacturing a transaction card having, for example, a laser plated film-based antenna.

FIG. 7 is a flow chart of an example process 700 for manufacturing or fabricating a transaction card having, for example, a laser plated film-based antenna. Process 700 may describe a process of manufacture for any one or more of FIGS. 1-5.

As shown in FIG. 7, process 700 may include providing a PCB within a transaction card (block 710). For example, a PCB may be provided within a transaction card, such as transaction card 110. In some implementations, the PCB may be provided on the transaction card (e.g., on a surface of the transaction card). In some implementations, the PCB may include an antenna trace, such as antenna trace 120.

As further shown in FIG. 7, process 700 may include forming a RF antenna layer, on a surface of the transaction card, using a laser plating or print-and-plate process (block 720). For example, a RF antenna layer may be formed on a surface of the transaction card. In some implementations, the RF antenna layer may include a pattern in which a conductive material is deposited to form a RF antenna. The RF antenna may be configured to be inductively connected to an antenna trace of the PCB. In some implementations, the RF antenna layer may be formed on the PCB. Additionally, or alternatively, the RF antenna layer may be provided between two or more layers of the transaction card. In some implementations, the RF antenna may be for NFC by the transaction card.

In some implementations, forming the RF antenna layer on the surface of the transaction card may include forming the RF antenna layer on a plastic film and affixing the plastic film on the surface of the transaction card. Additionally, or alternatively, the RF antenna layer may be formed on a graphical layer of the transaction card.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    affixing at least a portion of a substrate to a transaction card, wherein the transaction card is configured to store or communicate data for a transaction; and
    forming, after affixing the at least the portion of the substrate to the transaction card, an antenna layer on or in the substrate.

2. The method of claim 1, wherein the at least the portion of the substrate is affixed to a surface of the transaction card.

3. The method of claim 1, wherein the at least the portion of the substrate is an internal layer of the transaction card.

4. The method of claim 1, wherein the antenna layer is on or in another portion of the substrate different than the portion of the substrate affixed to the transaction card.

5. The method of claim 1, wherein the transaction card comprises an antenna trace, and wherein the antenna layer comprises an antenna.

6. The method of claim 5, wherein the antenna of the antenna layer and the antenna trace of the transaction card are configured to inductively connect with each other.

7. The method of claim 5, wherein at least one of the antenna trace or the antenna layer comprises a radio frequency (RF) antenna.

8. A device, comprising:
    a body comprising one or more components configured to store or communication data for a transaction;
    a substrate having at least a portion affixed to the body; and
    an antenna layer on or in the substrate.

9. The device of claim 8, wherein the at least the portion of the substrate is affixed to a surface of the device.

10. The device of claim 8, wherein the at least the portion of the substrate is an internal layer of the device.

11. The device of claim 8, wherein the antenna layer is on or in another portion of the substrate different than the portion of the substrate affixed to the body.

12. The device of claim 8, further comprising:
    an antenna trace on the body,
        wherein the antenna layer comprises an antenna.

13. The device of claim 12, wherein the antenna and the antenna trace are configured to inductively connect with each other.

14. The device of claim 12, wherein at least one of the antenna trace or the antenna layer comprises a radio frequency (RF) antenna.

15. A non-transitory computer-readable medium storing a set of instructions, the set of instructions comprising:
    one or more instructions that, when executed by one or more processors of a device, cause the device to:
        affix at least a portion of a substrate to a transaction card, wherein the transaction card is configured to store or communicate data for a transaction; and
        form, after affixing the at least the portion of the substrate to the transaction card, an antenna layer on or in the substrate.

16. The non-transitory computer-readable medium of claim 15, wherein the at least the portion of the substrate is affixed to a surface of the transaction card.

17. The non-transitory computer-readable medium of claim 15, wherein the at least the portion of the substrate is an internal layer of the transaction card.

18. The non-transitory computer-readable medium of claim 15, wherein the antenna layer is on or in another portion of the substrate different than the portion of the substrate affixed to the transaction card.

19. The non-transitory computer-readable medium of claim 15, wherein the transaction card comprises an antenna trace, and wherein the antenna layer comprises an antenna.

20. The non-transitory computer-readable medium of claim 19, wherein the antenna of the antenna layer and the antenna trace of the transaction card are configured to inductively connect with each other.

* * * * *